United States Patent
Kalafus

Patent Number: 5,877,725
Date of Patent: Mar. 2, 1999

[54] WIDE AUGMENTATION SYSTEM RETROFIT RECEIVER

[75] Inventor: Rudolph M. Kalafus, Los Gatos, Calif.

[73] Assignee: Trimble Navigation Limited, Sunnyvale, Calif.

[21] Appl. No.: 812,850

[22] Filed: Mar. 6, 1997

[51] Int. Cl.[6] ....................................... G01S 5/02
[52] U.S. Cl. .......................... 342/357; 701/214; 701/215
[58] Field of Search ............................. 342/357; 701/213, 701/214, 215

[56] References Cited

U.S. PATENT DOCUMENTS

| | | | |
|---|---|---|---|
| 5,621,646 | 4/1997 | Enge et al. | 342/357 X |
| 5,786,773 | 7/1998 | Murphy | 342/357 X |
| 5,820,085 | 10/1998 | Eschenbach | 342/357 X |

*Primary Examiner*—Mark Hellner
*Attorney, Agent, or Firm*—Wagner, Murabito & Hao

[57] ABSTRACT

The present invention comprises a Global Positioning System (GPS) Wide Area Augmentation System (WAAS) retrofit receiver. In one embodiment the present invention includes a receiver adapted to receive WAAS messages via an antenna. The receiver is further adapted to translate the WAAS messages into RTCM SC-104 standard messages and transmit the messages to an external GPS receiver via a communications link. In so doing, the external GPS receiver is able to utilize the WAAS messages without modification of the external GPS receiver.

16 Claims, 18 Drawing Sheets

RTCM Header -
Each RTCM Message

Each new RTCM Message

Set Preamble to '01100110'
Set Message Type to 1,2,6,9
Set Ref. Sta. ID to '0000000000'
Set Parity as per GPS/SPS Spec
Set Z-Count
Update Sequence Counter
Compute/Set No. of Data Words
Set Station Health (see below)

Continue

Station Health

WAAS Type 0 Received?

Yes → Set Station Health to '111'

No → Set Station Health to '000'

RTCM Range-Rate Correction Generation

RTCM User Differential Range Error (UDRE) Generation

RTCM Type 1 or 9, Each Satellite

Get UDRE From WAAS Type 2
Get GIVE From WAAS Type 26;
 Compute UDRE
Root-sum-square to Get Total UDRE
Divide by 3.27
Find Next Highest RTCM UDRE Value Continue

FIG. 15

WIDE AUGMENTATION SYSTEM RETROFIT RECEIVER

TECHNICAL FIELD

The present invention relates generally to navigation systems and more specifically to navigation receivers that operate with signals received from the global positioning system (GPS) and from fixed-location differential GPS broadcasting stations associated with the Federal Aviation Administration's Wide Area Augmentation System (WAAS).

BACKGROUND ART

The Navstar Global Positioning System, hereafter referred to simply as GPS, is a space based radio positioning network for providing users equipped with suitable receivers highly accurate position, velocity, and time (PVT) information. Developed by the United States Department of Defense (DOD), the space based portion of GPS comprises a constellation of GPS satellites in non-geosynchronous 12 hour orbits around the earth.

FIG. 1 shows the constellation 100 of GPS satellites 101 in orbit. The GPS satellites 101 are located in six orbital planes 102 with four of the GPS satellites 101 in each plane, plus a number of "on orbit" spare satellites (not shown) for redundancy. The orbital planes 102 of the GPS satellites 101 have an inclination of 55 degrees relative to the equator and an altitude of approximately 20,200 km (10,900 miles) and typically complete an orbit in approximately 12 hours. This positions each of the GPS satellites 101 in such a manner that a minimum of five of the GPS satellites 101 are normally observable (above the horizon) by a user anywhere on earth at any given time.

GPS position determination is based upon a concept referred to as time of arrival (TAO) ranging. The orbiting GPS satellites 101 each broadcast spread spectrum microwave signals encoded with positioning data. The signals are broadcast on two frequencies, L1 at 1575.42 MHz and L2 at 1227.60 MHz, with the satellite ephemeris (positioning data in an earth centered, earth fixed, coordinate system) modulated using bi-phase shift keying techniques. Essentially, the signals are broadcast at precisely known times and at precisely known intervals. The signals are encoded with their precise time of transmission. A user receives the signals with a GPS receiver. The GPS receiver is designed to time the signals and to demodulate the satellite orbital data contained in the signals. Using the orbital data, the GPS receiver determines the time between transmission by the satellite and reception by the receiver. Multiplying this by the speed of light gives what is termed the pseudo range measurement of that satellite. If the GPS receiver clock were perfect, this would be the range measurement for that satellite, but the imperfection of the clock causes them to differ by the time offset between actual time and receiver time. Thus, the measurement is called a pseudo range, rather than a range. However, the time offset is common to the pseudo range measurements of all the satellites. By determining the pseudo ranges of four or more satellites, the GPS receiver is able to determine its location in three dimensions, as well the time offset. Thus, a user equipped with a proper GPS receiver is able to determine his PVT with great accuracy, and use this information to safely and accurately navigate from point to point, among other uses.

Accurate navigation signals and accurate navigation data needs to be available at all times in order to assure safe navigation. For example, it is important to a ship maneuvering through a strait to know precisely its position heading and speed relative to known navigational hazards. Accuracy with respect to the GPS system typically refers to either predictable accuracy (the accuracy of the GPS determined location with respect to the charted location), repeatable accuracy (the ability of GPS receiver to return to the coordinates of a previously determined GPS position), and relative accuracy (the accuracy of a GPS determined position relative to that of another user of the same system at the same time), and each is important safe vessel navigation. Maritime vessels have come to rely upon GPS for accurate navigation data.

The GPS signals commonly available to civilian users are referred to as the standard positioning service (SPS). The accuracy of SPS is currently specified by DOD to be within 100 meters horizontal positioning accuracy 95% of the time and 300 meters 99.99% of the time. Horizontal accuracy of 100 meters may be adequate for some navigational applications, such as navigating a maritime vessel in open ocean waters, however, maritime navigation in coastal waterways often requires an increased level of accuracy. To provide increased accuracy, the Radio Technical Commission for Maritime Services (RTCM) established standards describing a differential correction GPS service, e.g., messages, format standards, communication bands, and the like.

Differential GPS functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast using the RTCM format to interested users having appropriate DGPS receivers. The corrections enable the users to increase the accuracy of their GPS determined position. Differential service using the RTCM standard is in wide use throughout the world. Tens of thousands of RTCM-compatible receivers have been built and are in operation. These RTCM-compatible receivers, however, are not WAAS-compatible nor are they easily upgraded to WAAS-compatibility.

Referring now to FIG. 2, a schematic diagram of a portion of a differential GPS scheme of operation 200 is shown. Differential GPS scheme 200 shows a plurality of GPS satellites 101, a land based reference station 202, a land based transmitter 203, and a differential GPS receiver equipped user 204. The differential GPS (hereafter DGPS) reference station 202 is fixed at a geodetically surveyed ground position. From this position the reference station tracks the signals of all GPS satellites in view, represented by lines 205. The reference station 202 uses the geodetically surveyed position, and the location of each satellite 101 as determined from the ephemeris data in the satellite transmission, to determine the actual range to the satellite. The reference station then subtracts the measured pseudo range from the actual range to obtain the differential correction for that satellite. After conversion to the RTCM format, the correction is broadcast via transmitter 203 to all users within the local area, e.g., user 204. To insure compatibility, the transmitter 203 broadcasts differential corrections in accordance with an RTCM defined standard. In so doing, any RTCM compliant receiver within range of the transmitter 203 is able to receive and demodulate the differential corrections.

User 204 tracks the GPS satellites in view, represented by lines 206, and determines his "GPS based" position. As described above, this position has a 95% confidence level accuracy on the order of 100 meters. User 204 receives the pseudo range corrections broadcast by the transmitter 203 and applies the corrections to his GPS based pseudo range measurements to derive a DGPS position, wherein the DGPS position has an accuracy of better than 10 meters (typically 1 to 3 meters). In this manner, DGPS greatly improves the accuracy of position information available to user 204. To determine corrections via DGPS methods, user 204 needs to be equipped with a DGPS capable receiver.

Referring now to FIG. 3, a prior art RTCM compatible DGPS receiver system 300 is shown. RTCM compatible DGPS receiver system 300 includes a standard RTCM compatible DGPS receiver 301 adapted to communicate with a RTCM radio demodulator 302 via a standard communications port 303. RTCM compatible DGPS receiver 301 receives GPS satellite signals via antenna 304. The GPS signals are down converted, then de-spread and demodulated by the digital signal processor (DSP) and passed to a processor, which computes the corrected pseudo ranges and determines the GPS based PVT. Information is communicated to the user via a display coupled to the processor and the processor is configured via a coupled user input (e.g., a keyboard or communications port).

RTCM radio demodulator 302 receives RTCM differential correction signals via antenna 305. The RTCM radio demodulator 302 and the RTCM compatible DGPS satellite receiver 301 are both designed and built to comply with the RTCM DGPS standards. Thus, the RTCM differential correction signals are demodulated by the RTCM radio demodulator and passed to RTCM compatible DGPS receiver 301 via a communications port 303. RTCM compatible DGPS receiver 301 applies the DGPS corrections to the GPS pseudo range measurements it determines from the received GPS satellite signals in order to determine a DGPS position. The RTCM radio demodulator can be physically attached to the GPS receiver such that the two form a single physical unit or merely linked to the GPS receiver via communications port 303 and physically mounted at a location away from the RTCM compatible DGPS receiver 301. Additionally, the communications port 303 can be one of many well known interface standards in use in the electronics field (e.g., RS-232, ARINC 429, ARINC 629, Milstd 1553, and the like).

There is a problem however in the fact that in order to determine DGPS positions, the DGPS receiver needs to be within range of an operating DGPS transmitter (hereafter RTCM transmitter). Many RTCM transmitters are located near busy waterways and harbors within the United States. DGPS functions adequately as long as the user remains within range of an RTCM transmitter, often yielding accuracies of one meter or less. In the open ocean, however, and in some waterways and harbors, there is no RTCM transmitter within range (typically 100 kilometers) or of suitable strength to be received. In addition, the farther the DGPS receiver is from the RTCM transmitter, the less accurate the DGPS determined position. In these situations, DGPS position accuracy is reduced. Beyond 100 kilometers, the utility of the corrections deteriorates. This problem has severely limited the utility of RTCM compatible DGPS receivers for the aviation community.

The FAA has recognized GPS overall has great potential benefits for aircraft navigation, and has implemented a new DGPS system called WAAS. Integrating WAAS based DGPS systems with GPS receivers is the subject of this invention. There is an impediment to quick and easy interaction, due to the fact that RTCM compatible DGPS receivers are not capable of easily utilizing wide area augmentation system (WAAS) signals. The FAA plans for WAAS to provide position determination accuracy of 5 meters or less 95% of the time. WAAS, as currently envisioned, will include a network of 22 to 50 ground reference stations with each station determining correction information. The correction information is subsequently processed and uplinked to geostationary satellites for retransmission to users.

The transmitted WAAS signals by themselves are not sufficient to determine a differentially corrected GPS position. An approximate present position is required to properly interpret the transmitted WAAS signals. This approximate present position is typically derived from a conventional, uncorrected GPS present position. Using the approximate present position, a WAAS compatible DGPS receiver uses the WAAS differential correction information to determine an accurate differentially corrected position.

As its name implies, WAAS will be capable of providing DGPS accuracy over very large areas, e.g., the continental United States. Additionally, WAAS provides GPS satellite integrity status by monitoring GPS satellite transmissions in real time and broadcasting integrity or "health" information to WAAS equipped GPS receivers. WAAS signals, however, are not compatible with typical RTCM compatible DGPS receivers. WAAS signals are not RTCM format compliant. As such, RTCM compatible DGPS receivers, e.g., DGPS receiver 300, cannot utilize WAAS capabilities.

Thus, what is required is a method and system of enabling RTCM compatible DGPS receivers to receive differential correction information from the new WAAS signals. Such a system should increase the accuracy of GPS determined positions over wide areas, without regard to distance of a DGPS receiver from a RTCM transmitter. What is further required is a system which allows RTCM compatible DGPS receivers to utilize the GPS satellite integrity monitoring capability of the WAAS network.

DISCLOSURE OF THE INVENTION

The present invention comprises a Global Positioning System (GPS) Wide Area Augmentation System (WAAS) retrofit receiver. In one embodiment, the present invention includes a receiver adapted to receive WAAS messages via an antenna. The receiver is further adapted to translate the WAAS messages into RTCM SC-104 standard messages and transmit the messages to an external RTCM compatible DGPS receiver via a communications link. The external RTCM compatible DGPS receiver is designed to accept RTCM SC-104 standard messages to determine a differential GPS position. The retrofit receiver of the present invention allows the external RTCM compatible DGPS receiver to utilize the WAAS positioning information without modification of the external RTCM compatible DGPS receiver.

In this manner, the GPS WAAS retrofit receiver of the present invention increases the accuracy of GPS determined positions over wide areas, without regard to distance of the RTCM compatible DGPS receiver from an RTCM transmitter. The GPS WAAS retrofit receiver of the present invention provides a method and system which overcomes the range limitations of RTCM compatible DGPS receivers relying upon RTCM transmitters. Further, the present invention provides a system which allows RTCM compatible DGPS receivers to utilize the GPS satellite integrity monitoring capability of the WAAS network.

In another embodiment, the RTCM messages are transmitted to a plurality of RTCM compatible DGPS receivers using wireless transmission techniques. The GPS WAAS retrofit receiver of the present invention would transmit the WAAS derived but RTCM encoded messages at any number of available frequency bands which the plurality of RTCM compatible DGPS receivers would expect to find "ordinary" RTCM message transmissions. In this embodiment, the plurality of RTCM compatible DGPS receivers are able to function normally regardless of the distance from the nearest ordinary RTCM transmitting ground station and utilize the GPS satellite integrity monitoring capability of the WAAS network. In addition, this embodiment eliminates the requirement for a geodetically surveyed position on which to locate an RTCM transmitter.

In yet another embodiment of the retrofit receiver of the present invention, the retrofit receiver interacts with the RTCM compatible DGPS receiver it is coupled to in order to obtain a GPS determined position. A rough position fix is required in order to properly interpret the WAAS messages. The retrofit receiver obtains a GPS determined position and satellite orbital parameters from the RTCM compatible DGPS receiver. The GPS determined position is subsequently used to interpret the WAAS messages and translate them into RTCM messages. The RTCM messages are then transmitted to the RTCM compatible DGPS receiver, in the manner described above, where they are used to determine a high accuracy DGPS position fix. By using the RTCM compatible DGPS receiver to obtain the rough position fix, the retrofit receiver can be fabricated less expensively.

BRIEF DESCRIPTION OF THE DRAWINGS

The accompanying drawings, which are incorporated in and form a part of this specification, illustrate embodiments of the invention and, together with the description, serve to explain the principles of the invention:

Prior art

Prior art

Prior art

FIG. 11 shows the RTCM Header portion of the translation process of the present invention.

FIG. 15 shows the RTCM user differential range error (UDRE) generation portion of the translation process of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises a Global Positioning System (GPS) Wide Area Augmentation System (WAAS) retrofit receiver. Differential GPS functions by observing the difference between pseudo range measurements determined from the received GPS signals with the actual range as determined from the known reference station point. The observed differences, or differential corrections, are transmitted to users, enabling them to increase the accuracy of their GPS receivers, using established standards set by the Radio Technical Commission for Maritime Service (RTCM). GPS receivers capable of accepting and utilizing differential correction signals are able to determine present position with much greater accuracy than "standard" type GPS receivers and are referred to as differential GPS (DGPS) receivers. DGPS receivers capable of accepting and utilizing RTCM type signals (RTCM compatible DGPS receivers), however, are not capable of accepting and utilizing differential corrections from the wide area augmentation system (WAAS) of the Federal Aviation Administration (FAA). The retrofit receiver of the present invention, however, allows RTCM compatible DGPS receivers to utilize WAAS capabilities, in essence, transforming them into WAAS type DGPS receivers. The retrofit receiver of the present invention and its benefits are described in greater detail below.

Figure 1:
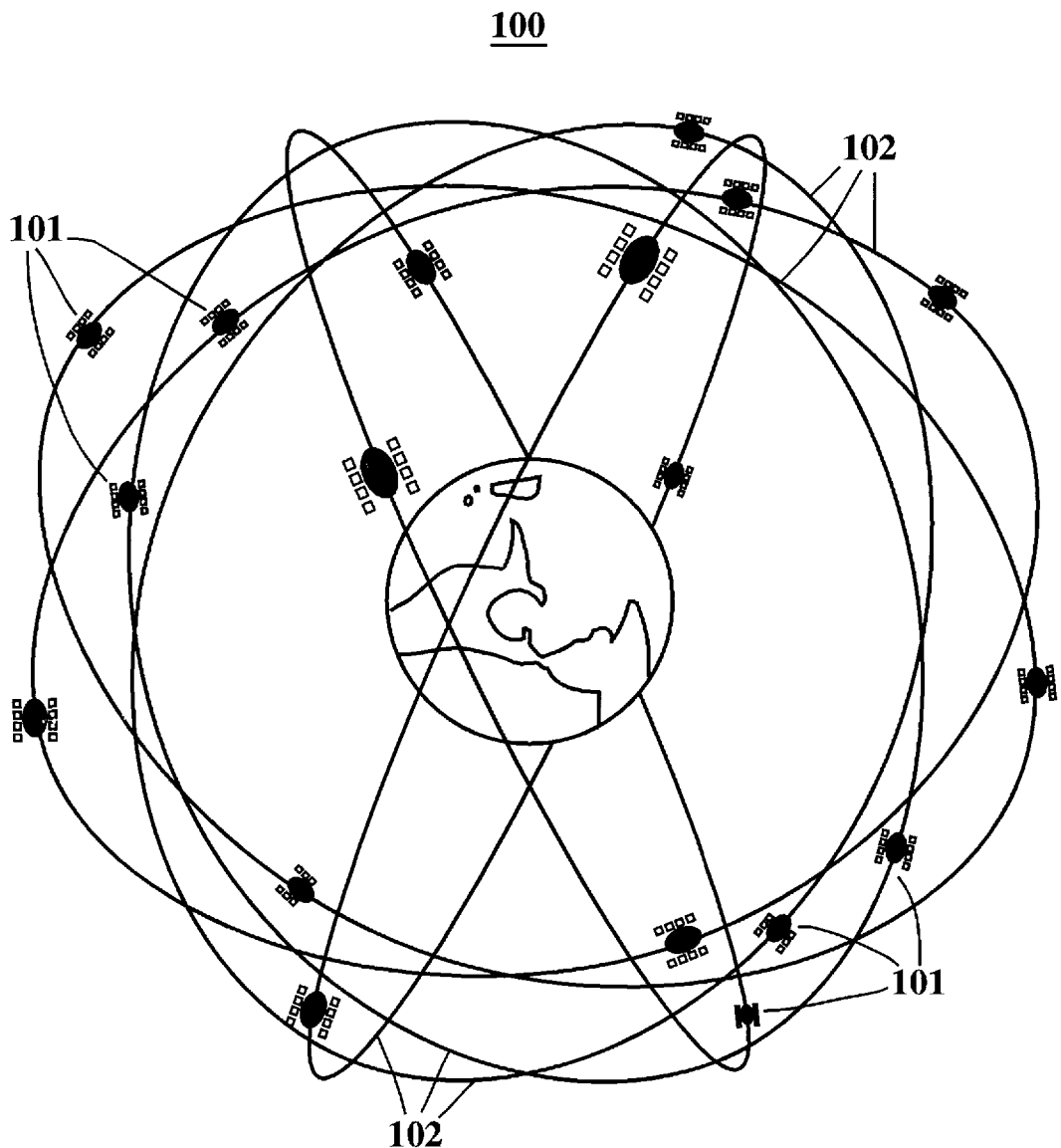
FIG. 1 shows a constellation of GPS satellites in orbit.
Figure 2:
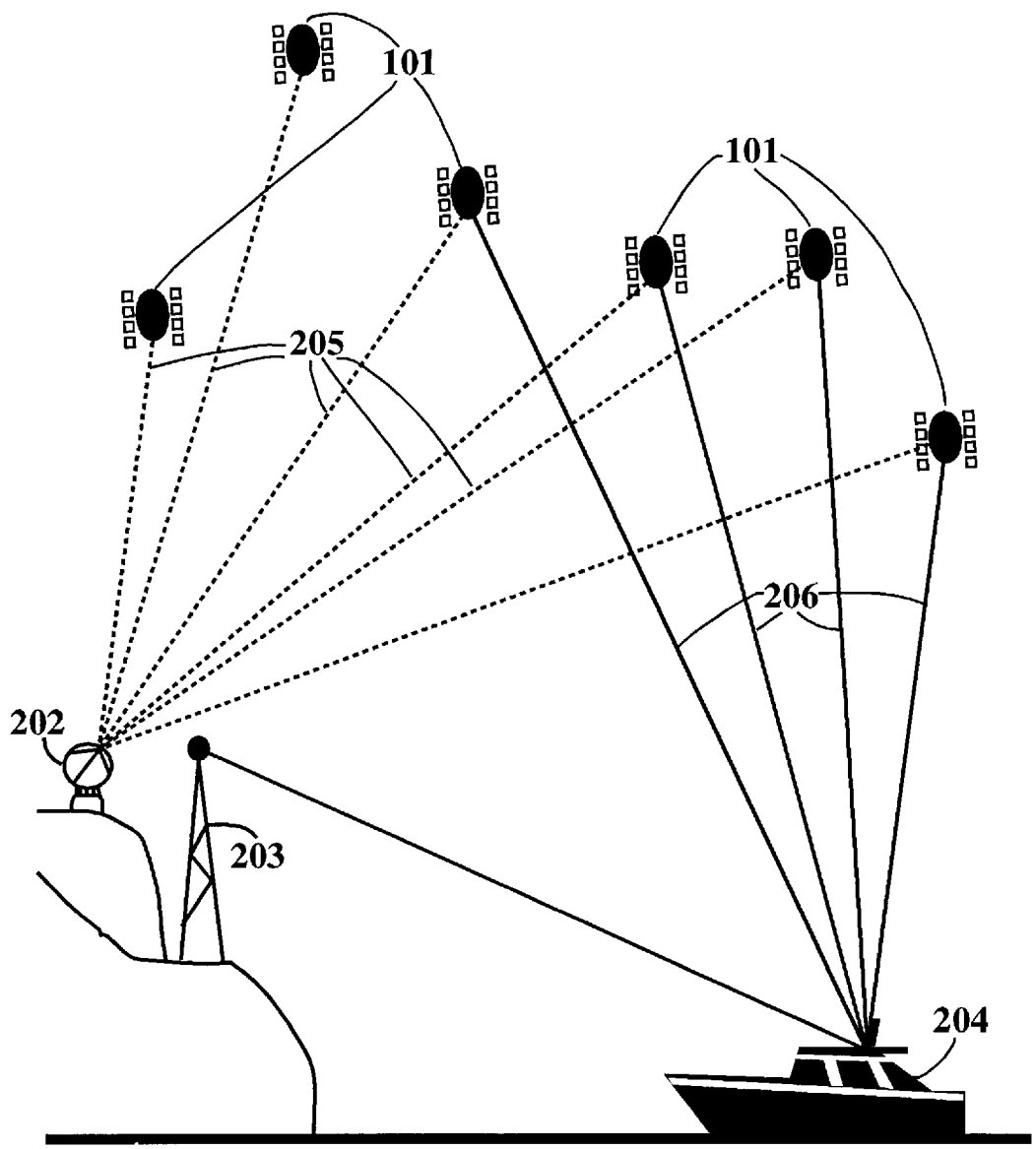
FIG. 2 shows a schematic diagram of a differential GPS scheme of operation.
Figure 3:
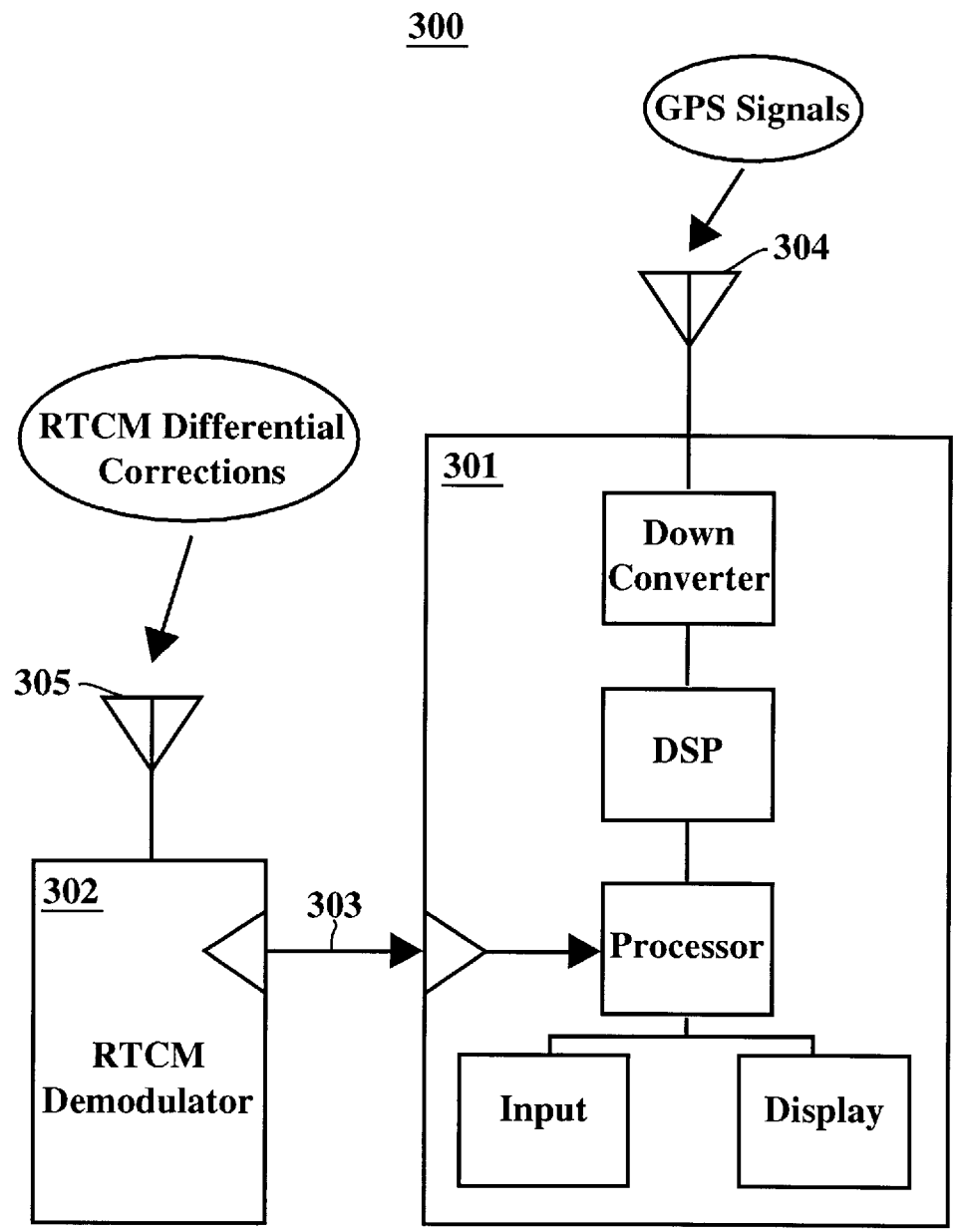
FIG. 3 shows a prior art DGPS receiver system including a standard GPS receiver adapted to communicate with a differential corrections radio demodulator.
Figure 4:
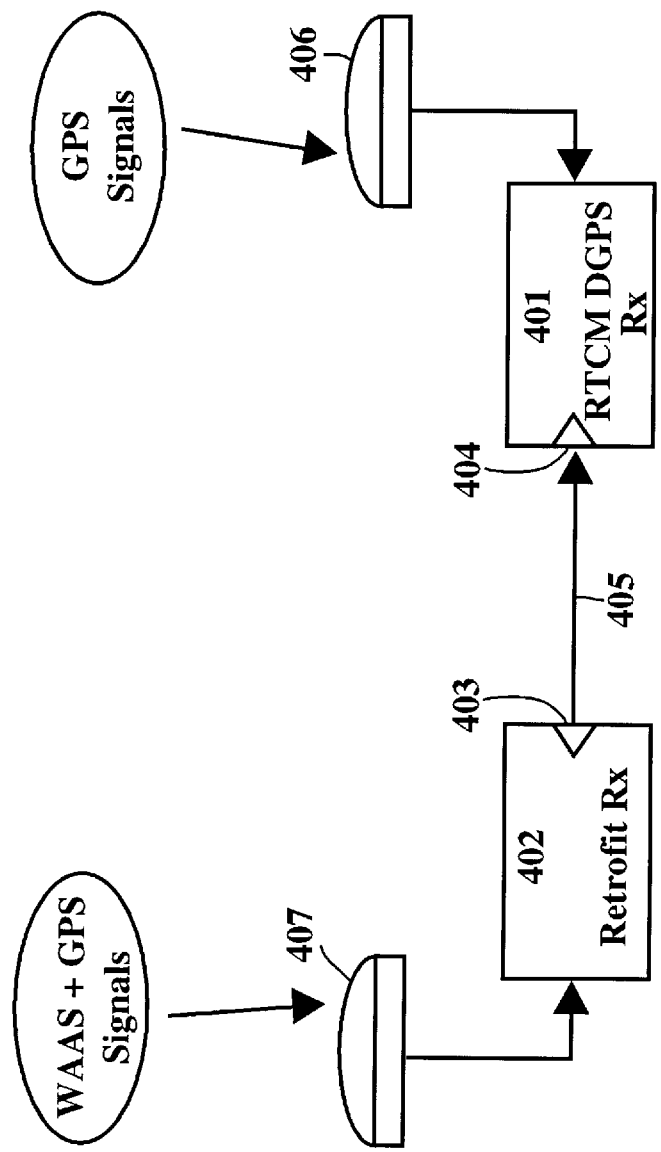
FIG. 4 shows an RTCM compatible DGPS receiver equipped with a non-cooperative retrofit receiver in accordance with one embodiment of the present invention.

Referring now to FIG. 4, a non-cooperative retrofit receiver 402 in accordance with one embodiment of the present invention is shown. The non-cooperative retrofit receiver 402 (hereafter retrofit receiver 402) of the present embodiment is equipped with a communications port 403 (e.g., an RS-232 compliant communications port, ARINC 429, ARINC 629, Milstd 1553, or industry standard interfaces) and is coupled to a second similar communications port 404 built into RTCM compatible DGPS receiver 401 via a transmission line 405. The retrofit receiver 402 is equipped with an antenna 407 and the RTCM compatible DGPS receiver 401 is equipped with an antenna 406.

The retrofit receiver 402 translates the WAAS differential correction signals (containing WAAS messages) into RTCM SC-104 standard differential correction signals (containing RTCM messages) and transmits the signals to the RTCM compatible DGPS receiver (hereafter conventional receiver) 401 via the communications port 403, such that the conventional receiver 401 is able to utilize the WAAS differential correction signals without modification of the conventional receiver 401.

WAAS messages by themselves are not sufficient to determine a translated RTCM differential correction message. The antenna 407 receives GPS signals in addition to WAAS differential correction signals. The retrofit receiver 402 uses the GPS signals to determine an approximate GPS based present position. Using the GPS determined present position, the retrofit receiver of the present invention uses the WAAS differential correction information to determine RTCM correction messages. An RTCM signal (containing the translated RTCM messages) is transmitted to the conventional receiver 401, in the manner described above.

In so doing, retrofit receiver 402 of the present invention provides the capabilities and performance advantages of WAAS to conventional receiver 401. For example, WAAS will be capable of providing DGPS accuracy over very large areas, e.g., the continental United States. Additionally, WAAS provides GPS satellite integrity status by monitoring GPS satellite transmissions in real time and broadcasting integrity or "health" information to WAAS equipped GPS receivers. Thus, the present invention overcomes the range limitations of conventional receivers relying upon RTCM transmitters. Conventional receivers 401, equipped with the retrofit receiver 402 of the present invention are capable of increased, WAAS type, DGPS accuracy over wide areas, without regard to distance from any particular reference station. In addition, the retrofit receiver 402 of the present invention allows conventional receiver 401 to utilize the GPS satellite integrity monitoring capability of the WAAS network.

It should be noted that the non-cooperative retrofit receiver of the present embodiment does not require input from the conventional receiver 401. As discussed above, a rough position fix is required to properly interpret the WAAS messages. Hence, retrofit receiver 402 is equipped with an inexpensive GPS receiver having less capable components since high accuracy is not required. However, because retrofit receiver 401 does not require input, the non-cooperative embodiment of the present invention is compatible with virtually any RTCM compatible DGPS receiver on the market.

Figure 5:
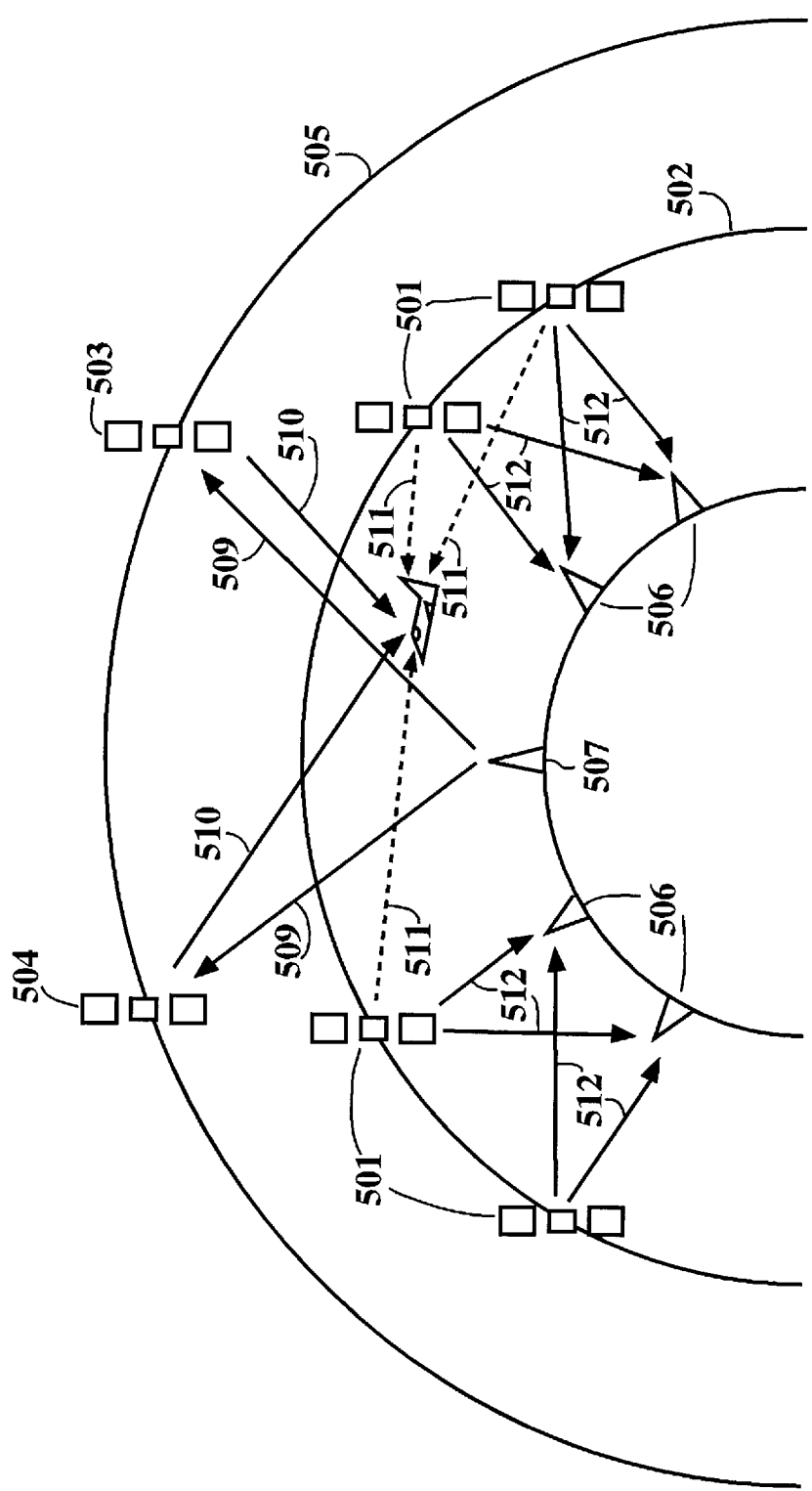
FIG. 5 shows a schematic diagram of a portion of the GPS satellite constellation in operation with WAAS, in a view of the earth centered on the north pole.

FIG. 5 shows a schematic diagram of a portion of the GPS satellite constellation in operation with WAAS, in a view of the earth centered on the north pole N. The GPS satellites 501 are shown in their 20,200 km orbit 502. Two WAAS signal broadcasting satellites, 503 and 504, are shown are shown in their approximately 40,000 km geosynchronous orbit 505. A plurality of WAAS reference stations 506 are coupled with a navigation earth station 507. A user having a conventional receiver equipped with a retrofit receiver (hereafter WAAS-RTCM receiver) 508 in accordance with the present invention is also shown.

Referring still to FIG. 5, as discussed above, GPS position determination is based upon a concept referred to as time of arrival (TOA) ranging, wherein the GPS satellites 501 each broadcast spread spectrum microwave signals, encoded with positioning data, on two frequencies, L1 at 1575.42 MHz and L2 at 1227.60 MHz. The WAAS-RTCM receiver 508 is adapted to demodulate the positioning data contained in the signals and use the positioning data to determine the precise distance between the GPS receiver 508 and the corresponding one of the transmitting GPS satellites 501. By receiving signals from several of the GPS satellites 501, the GPS receiver 508 is able to determine its location. This location, as discussed above, is typically accurate to within 100 meters 95% of the time. The WAAS system, similar to other differential GPS systems, is designed to augment the basic SPS accuracy through a system of differential corrections to increase accuracy by at least an order of magnitude.

The WAAS system was designed by the FAA to be a safety-critical system to support all phases of aircraft navigation, and as such, was designed to augment GPS such that GPS can eventually be used as a primary aircraft navigation sensor. The WAAS system provides availability and reliability services by monitoring satellite integrity in addition to providing differential corrections.

Referring still to FIG. 5, the basic underpinning of WAAS is the network of WAAS reference stations 506. Each of the WAAS reference stations 506 monitor the signals of the GPS satellites 501 in view and measures the pseudo range to each, represented by lines 512. Since the signal of each GPS satellite 501 contains precise information on its orbit, and the precise position of each of the WAAS reference stations are known, the absolute range to each of GPS satellite 501 in view can be calculated. This information along with the pseudo range measurements from all the satellites in view from all the reference stations in the WAAS network enables the WAAS master station to separately estimate the magnitudes of satellite clock dither, satellite clock drift, ephemeris errors, ionospheric delays, and tropospheric delays, as well as to determine if satellite clock failures have occurred. The above information for each GPS satellite 501 is assimilated into a WAAS message. The WAAS message is sent to navigation earth station 507, where it is subsequently uplinked, represented by lines 509, to the WAAS signal broadcasting satellites 503 and 504. WAAS signal broadcasting satellites 503 and 504 then broadcast the WAAS message to properly equipped users from geostationary orbit. Due to the number of ground reference stations collecting raw data and the broadcasting of the WAAS messages from geosynchronous orbit, WAAS is capable of providing DGPS accuracy over very large areas, e.g., the continental United States.

The WAAS-RTCM receiver 508 receives the WAAS message broadcast by WAAS signal broadcasting satellites 503 and 504, represented by lines 510, and receives GPS signals from GPS satellites, represented by lines 511. The retrofit receiver uses the GPS signals to determine a GPS based present position, which is used to interpret the WAAS messages. The retrofit receiver subsequently translates the WAAS messages into an RTCM SC-104 standard message. The WAAS-RTCM receiver 508 also receives GPS signals, represented by lines 511, and uses the RTCM message provided by the retrofit receiver to compute a differentially corrected GPS position. Additionally, the WAAS-RTCM receiver 508 provides the added benefits of WAAS, such as near real time GPS satellite integrity monitoring. In so doing, WAAS-RTCM receiver 508 provides the user with the capabilities and performance advantages of WAAS.

Due to the number of ground reference stations and the broadcasting of the WAAS messages from geosynchronous orbit, WAAS is capable of providing DGPS accuracy over very large areas, e.g., the continental United States. Additionally, WAAS provides GPS satellite integrity status by monitoring GPS satellite transmissions in real time and broadcasting integrity or "health" information to WAAS equipped GPS receivers. Thus, the present invention overcomes the range limitations of prior art conventional receivers relying upon prior art RTCM transmitters. Conventional receivers equipped with the retrofit receiver of the present invention are capable of increased, WAAS type, DGPS accuracy over wide areas, without regard to distance from an RTCM transmitter.

Figure 6:
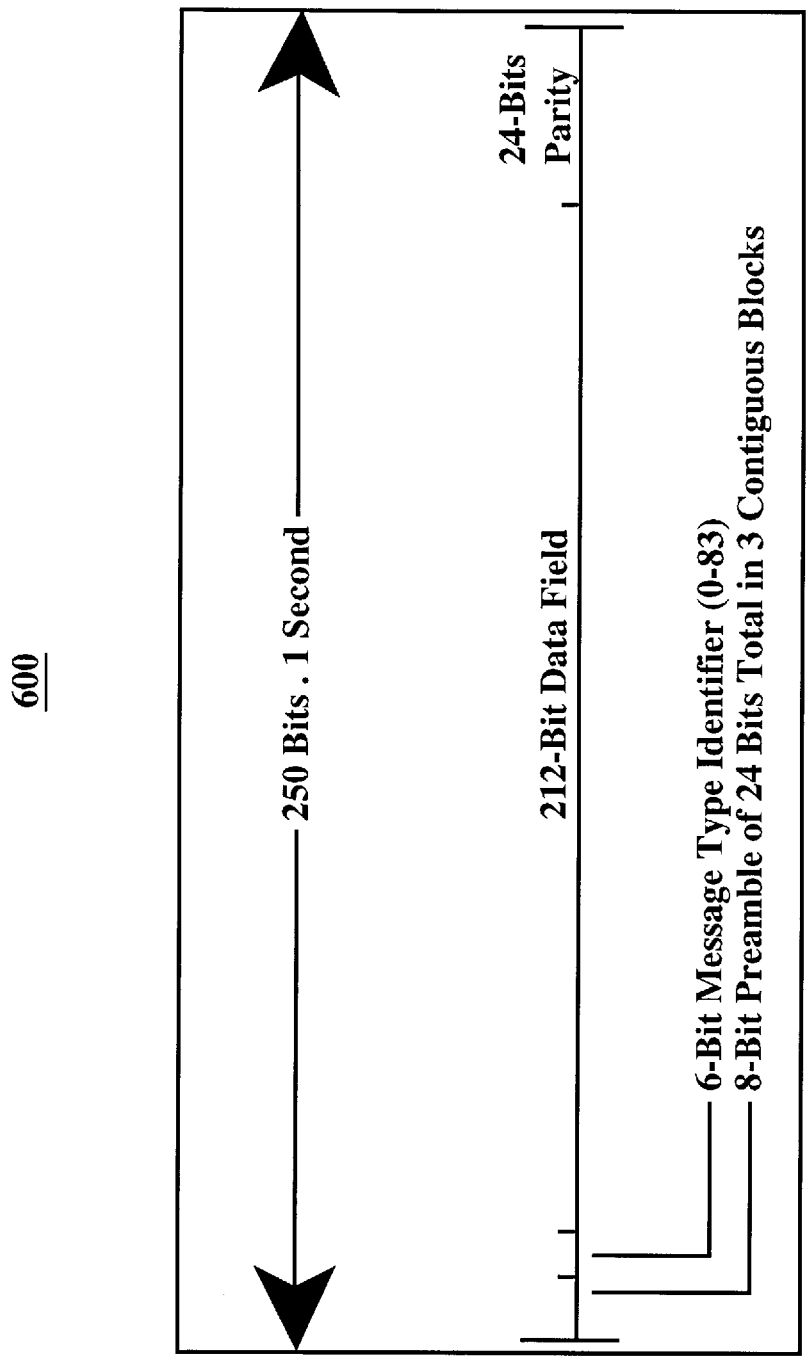
FIG. 6 shows the basic WAAS data format.

Referring now to FIG. 6, the basic WAAS data format is shown. In general, the WAAS message format and overall system specifications are FAA approved and are well known in the GPS products industry. The WAAS messages 600 contains separate corrections for each GPS satellite. The WAAS messages also carry estimates of the distortions caused by the earth's ionosphere for a "grid" of locations across North America. The WAAS messages provides a standardized format for DGPS over a continental area. Using a WAAS broadcast data rate of approximately 250 bits per second, a WAAS message stream carries corrections for all 24 GPS satellites. The basic WAAS message is 250 bits in length. At the 250 b/s data rate, the duration of the WAAS message is 1 second.

Referring still to FIG. 6, each WAAS message block comprises the following, as shown: an 8 bit preamble; a 6 bit message type; a 212 bit data field; and a 24 bit cyclic redundancy check parity. The 8 bit preamble is actually a 24 bit preamble distributed across 3 successive message blocks. The message type field is 6 bits long, which allows for 64 different messages. Each WAAS message shares the basic format shown in FIG. 6. The messages are received by WAAS capable receivers, e.g., the retrofit receiver 502, and used to compute WAAS DGPS positions, along with other WAAS attributes.

Figure 7:
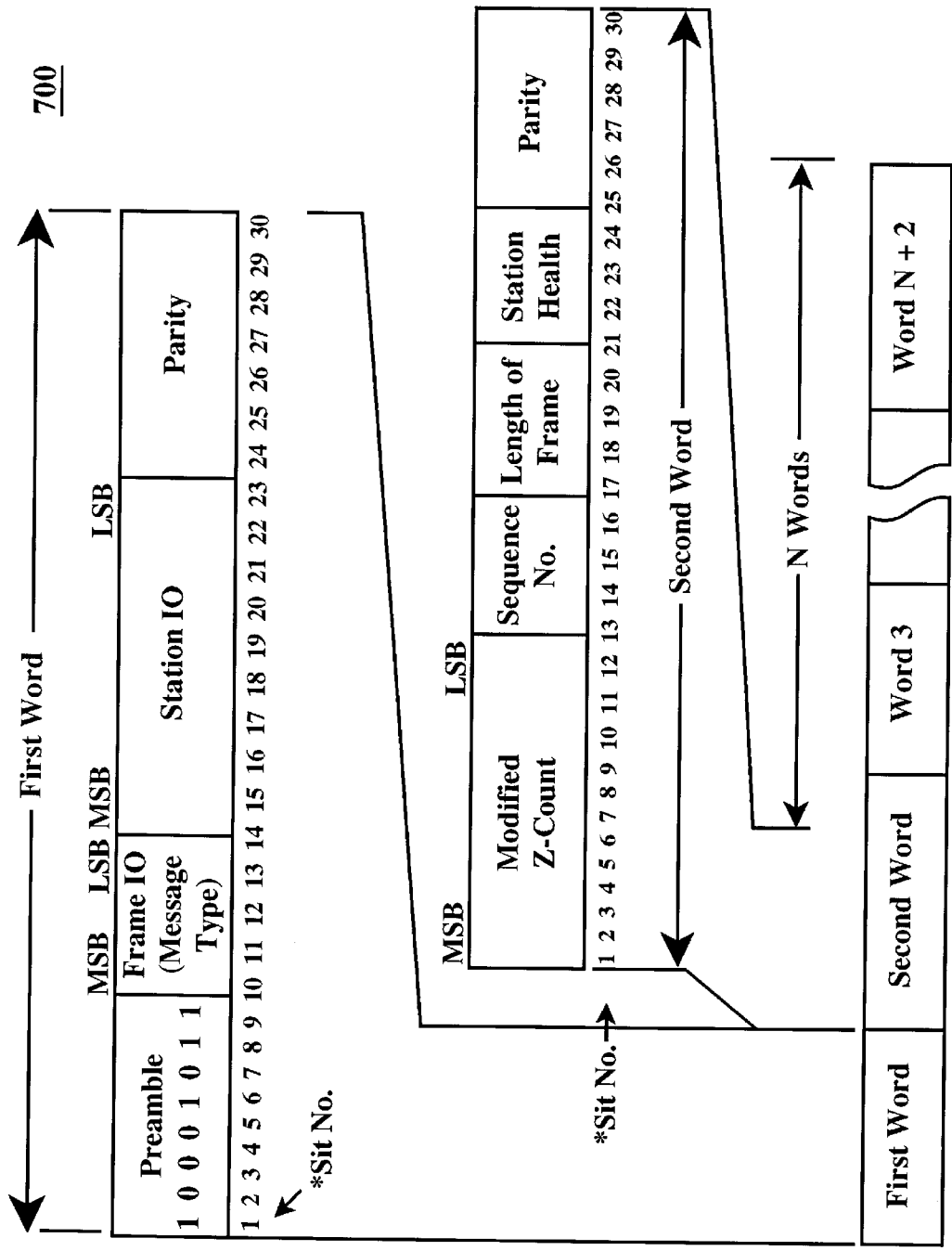
FIG. 7 shows the format of the first two words of an RTCM message.

With reference now to FIG. 7, the message format of the first two words of an RTCM message is shown. Each RTCM message frame is made up of several 30 bit words, always headed by two standard words which are shown in FIG. 7. The first word provides the following, as shown: an 8 bit fixed preamble; a 4 bit message identifier; a 12 bit station identifier; and 6 parity bits. The second word provides the following: 16 bits of timing data (modified Z count and sequence number); 5 bit message frame length; 3 bit station health information; and 6 parity bits. The number of following words in an RTCM message can vary from zero to 31 depending on the message type and the number of GPS satellites in view of the RTCM ground reference station. The RTCM messages are received by RTCM capable receivers, e.g., prior art RTCM type DGPS receivers, and used to compute RTCM DGPS positions. The RTCM type DGPS receivers are manufactured to accept RTCM messages, as opposed to WAAS messages, and are thus unable to utilize the advantages of WAAS without the retrofit receiver of the present invention.

The retrofit receiver of the present invention translates the WAAS messages from the WAAS format into the RTCM format. In so doing, all the information contained in the WAAS message is retained and passed along to the RTCM type DGPS receiver as if the RTCM type DGPS receiver were still connected to a typical prior art RTCM radio demodulator. The messages are in the RTCM format the RTCM type DGPS receiver was manufactured to interface with. Thus, the retrofit receiver of the present invention provides the capabilities and performance advantages of WAAS to RTCM type DGPS receivers without modification of the RTCM type DGPS receivers. The WAAS to RTCM translation process is described in greater detail below.

Figure 8:
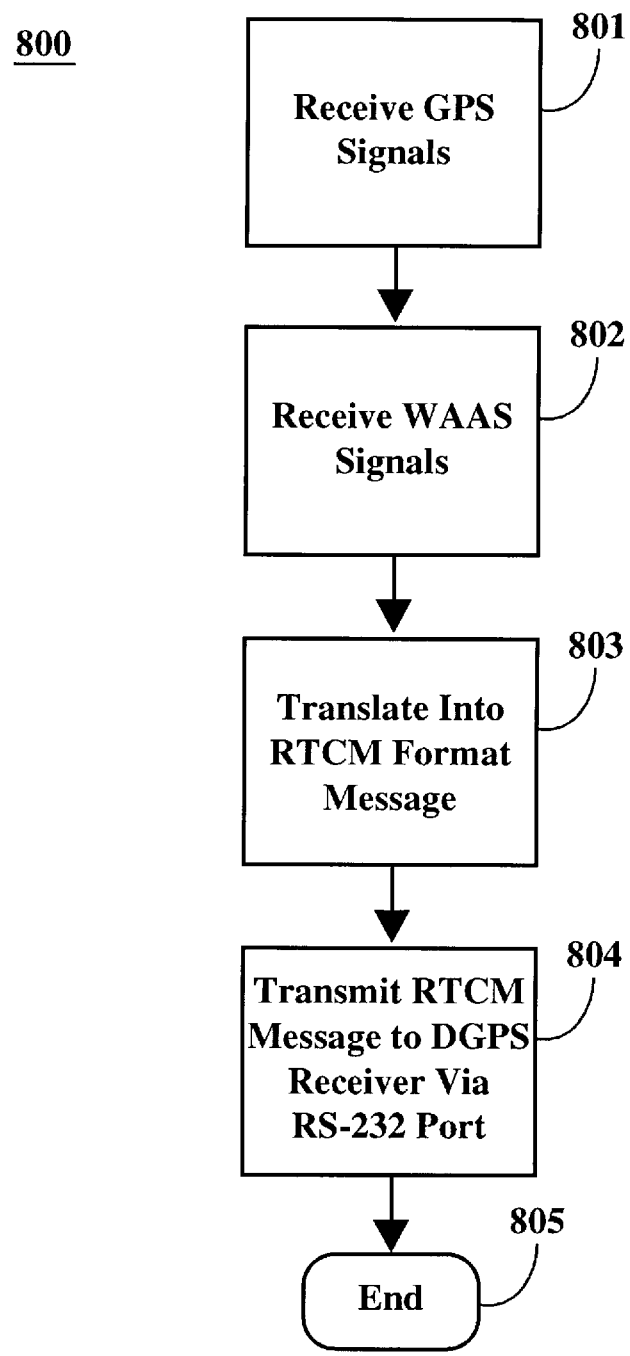
FIG. 8 shows a flow chart of the steps of the process of one embodiment of the present invention.

Referring now to FIG. 8, a flow chart of the steps of the process 800 of one embodiment of the present invention is shown. In step 801, a retrofit receiver in accordance with the present invention receives GPS signals from GPS satellites which are in view. The retrofit receiver uses the GPS signals to determine a present position. In step 802, the retrofit receiver receives WAAS signals from the geostationary WAAS signal broadcasting satellites. In step 803, the retrofit receiver, using the GPS determined present position, translates WAAS messages contained in the WAAS signals into RTCM messages. In step 804, the retrofit receiver transmits the RTCM messages to an external DGPS receiver via a communications port, thus, enabling the external DGPS receiver to determine a DGPS present position and to utilize other WAAS advantages without modification of the external DGPS receiver. The process ends in step 805.

Figure 9:
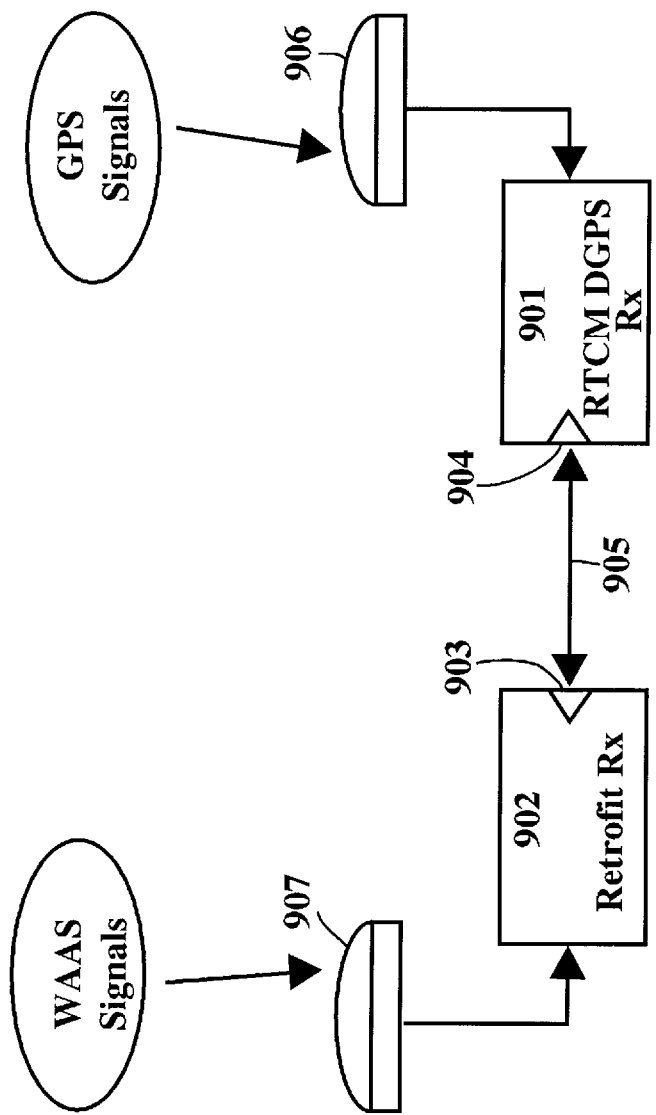
FIG. 9 shows an RTCM compatible DGPS receiver equipped with a cooperative retrofit receiver of one embodiment of the present invention.

Referring now to FIG. 9, a cooperative retrofit receiver 902 in accordance with one alternate embodiment of the present invention is shown. The cooperative retrofit receiver 902 (hereafter retrofit receiver 902) of the present embodiment is equipped with an industry standard communications port 903 and is coupled to a second similar communications port 904 built into an RTCM compatible DGPS receiver 901 via a two way communications link 905. Antenna 907 receives WAAS signals and couples them to retrofit receiver 902 and antenna 906 receives GPS signals and couples them to RTCM compatible DGPS receiver 901.

In the embodiment of FIG. 9, the retrofit receiver 902 receives the required rough position fix from the RTCM compatible DGPS receiver 901 (hereafter conventional receiver 901). Hence, retrofit receiver 902 need not include components for tracking GPS satellites. By relying upon conventional receiver 901 for GPS position and ephemeris inputs, however, the population of RTCM compatible DGPS receivers (e.g., conventional receiver 901) with which the retrofit receiver 902 could successfully interface with is reduced. This is due to the fact that many manufacturers have different protocols and message definitions for providing position and ephemerides. Receivers from some manufacturers do not provide position or ephemeris at all. It should be appreciated, however, that for those conventional receivers that can provide the necessary information, the design and cost of their corresponding retrofit receivers would be significantly reduced. In these instances, the retrofit receiver need only track the WAAS satellites and can ignore the GPS satellites, and can be less expensively produced.

Figure 10:
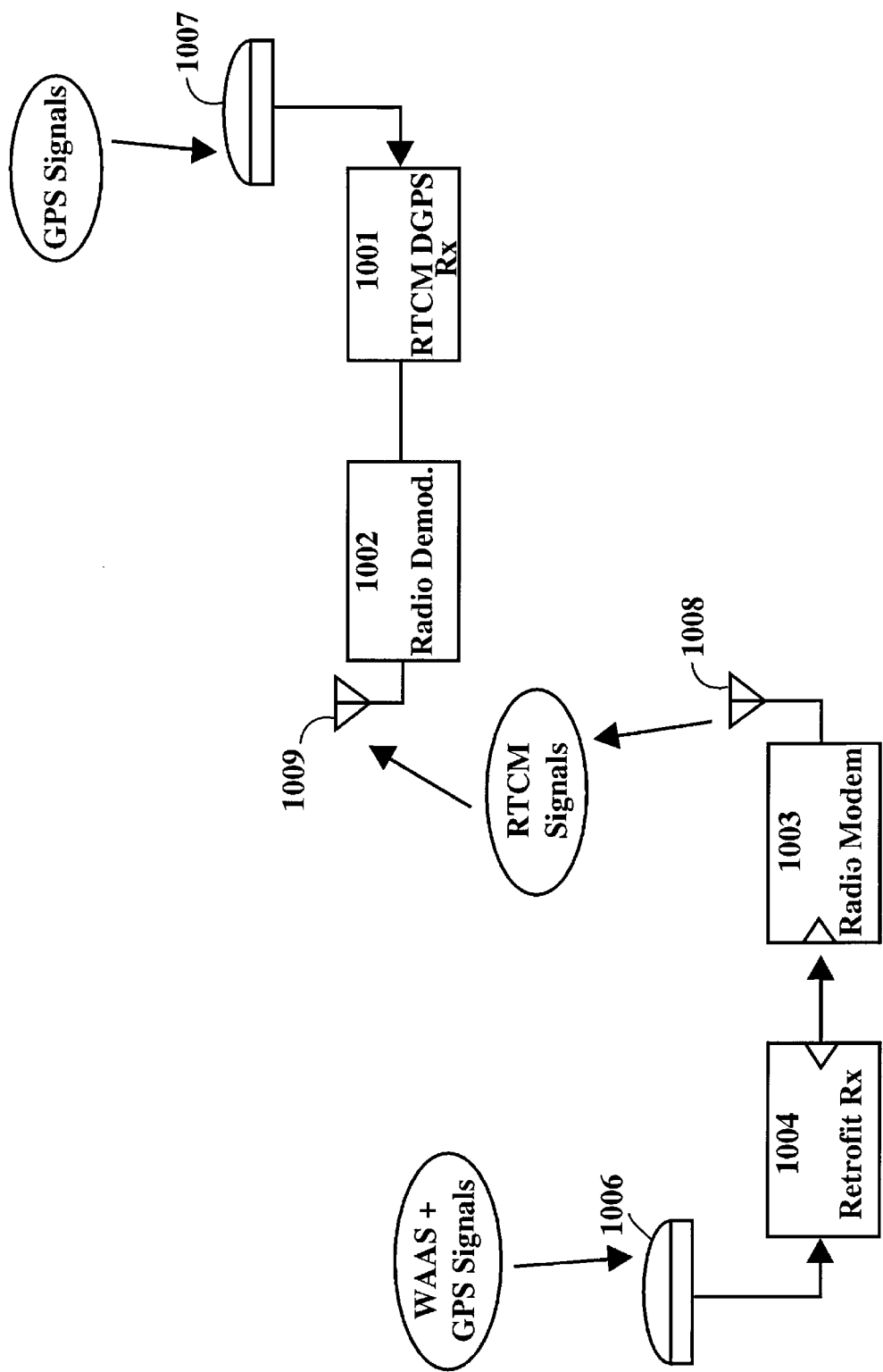
FIG. 10 shows an RTCM compatible DGPS receiver equipped with a portable reference station retrofit receiver of one embodiment of the present invention.

Referring now to FIG. 10, a portable reference station retrofit receiver 1004 in accordance with one alternate embodiment of the present invention is shown. RTCM compatible DGPS receiver 1001 is equipped with an RTCM radio demodulator 1002. RTCM compatible DGPS receiver 1001 receives GPS signals via GPS antenna 1007 and RTCM radio demodulator 1002 receives RTCM format differential corrections via antenna 1009. Retrofit receiver 1004 receives WAAS signals and GPS signals via antenna 1006 and translates the WAAS messages into RTCM messages. A radio modem 1003 receives the RTCM messages from the retrofit receiver 1004 and transmits them via antenna 1008.

The portable reference station embodiment of FIG. 10 is attractive to users having a complete system of several mobile RTCM compatible DGPS receivers, data link equipment, and several RTCM demodulators. In this embodiment, the need for precise geodetically surveyed positions on which to locate RTCM transmitters is obviated. Because of this, the portable reference station embodiment of the retrofit receiver supports easy portability of the entire system from one location to another. This embodiment also supports a reference station platform that may itself be in motion. For example, retrofit receiver could be mounted on a ship at sea and a plurality of buoys or markers, each having an RTCM compatible DGPS receiver, could be used to track an oil slick. The plurality of RTCM compatible DGPS receivers on the buoys would fuction by receiving RTCM messages from the retrofit receiver on the ship. It should be noted that each RTCM compatible DGPS receiver on the buoys could also be upgraded using a retrofit receiver of the present invention.

Thus, the Global Positioning System (GPS) Wide Area Augmentation System (WAAS) retrofit receiver of the present invention enables RTCM DGPS receivers to receive the new WAAS signals. The present invention provides a method and system which overcomes the range limitations of RTCM DGPS receivers relying upon RTCM transmitters. The WAAS retrofit receiver of the present invention increases the accuracy of GPS determined positions over wide areas, without regard to distance from the RTCM DGPS receiver from an RTCM transmitter. Further, the present invention provides a system which allows RTCM DGPS receivers to utilize the GPS satellite integrity monitoring capability of the WAAS network.

Detailed Description of the WAAS to RTCM Translation Process

As described above, the present invention translates WAAS messages to RTCM messages. The following section describes many of the primary steps of the translation process of the present invention. The WAAS messages described below may change, but the principles inherent in the following discussion can be applied to any such changes as may occur.

Table 1 describes the WAAS message types which need to be decoded.

TABLE 1

| Type 0 | Don't use the system |
| Type 1 | Satellite mask information |
| Type 2 | Fast corrections - provides fast pseudo range corrections, |

TABLE 1-continued

| | UDRE |
| Types 18–22 | Ionospheric mask messages - identifies latitude longitude grid points |
| Type 24 | Slow corrections - provides clock, ephemeris data |
| Type 25 | Mixed Fast/Slow corrections |
| Type 26 | ionospheric delays - provides ionospheric delay data |
| Type 27 | Service message - describes degradation of UDRE outside |

Table 2 describes the RTCM message types which will be supported.

TABLE 2

| Type 1 | Basic differential corrections - pseudo range corrections, range rate corrections, satellite ID, UDRE (quality factor) |
| Type 2 | "Delta" differential corrections - accommodates ephemeris changes |
| Type 6 | Filler messages with no cpntent, provided for certain data links that reguire continuous transmission of data |
| Type 9 | Same as Type 1, but not a complete satellite set |

Table 3 describes RTCM Header information. The RTCM header requires several pieces of information. This portion of the translation process is further described in FIG. 11.

TABLE 3

| Preamble | Set to "01100110" |
| Message Type | Set to 1, 2, 6, or 9 as appropriate |
| Ref. Station ID | Set to "00000000000" |
| Parity | Use GPS scheme for deriving 6-bit parity throughout |
| Modified Z-Count | The modified Z-count is the reference time of the corrections, to the nearest 0.6 seconds in GPS time. This is not completely compatible with the WAAS, which requires that the receiver reference WAAS information to the one second epoch in WAAS network tirne. How this is done is described below |
| Sequence No. | A running 3-bit counter, updated each RTCM message |
| No. of Data Words | Computed to match the RTCM message |
| Station Health | Set to "000" unless the WAAS is transmitting Type 0 messages, in which case, set to "111" |

Message timing—Modified Z-count: The WAAS specification requires the system to maintain WAAS network time and GPS time within tens of nanoseconds. As a consequence, there is no need to obtain this number from the WAAS messages (although the information is provided in a WAAS message type 12). The time reference of the corrections need only be good to the nearest tenth of a second or so. However, since the WAAS information is time referenced to 1 second epochs while the RTCM time is referenced to 0.6 second epochs, the processor of the WAAS retrofit receiver must be adjusted for this. One method of doing this is to use successive WAAS fast pseudo range corrections and interpolate the pseudo range corrections at the most recent RTCM Z-count. Other WAAS correction terms do not change rapidly enough to require adjustment.

Figure 12:
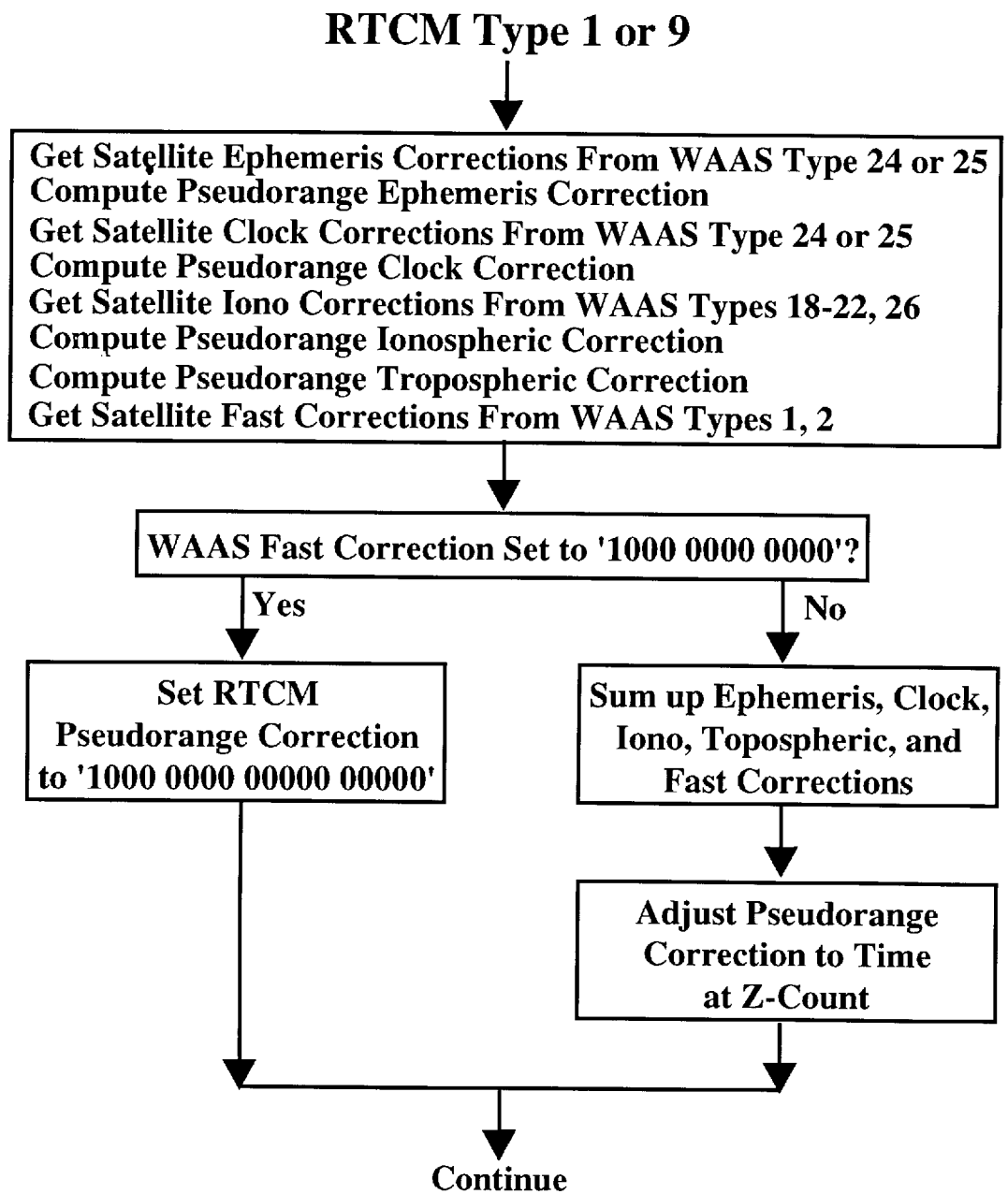
FIG. 12 shows RTCM pseudo range correction generation portion of the translation process of the present invention.

RTCM Pseudo range correction generation (RTCM Types 1 and 9): Table 4 describes the computations which need to be made for each satellite being tracked (once the fast WAAS correction term has been computed as described above). This portion of the translation process is further described in FIG. 12.

Figure 13:
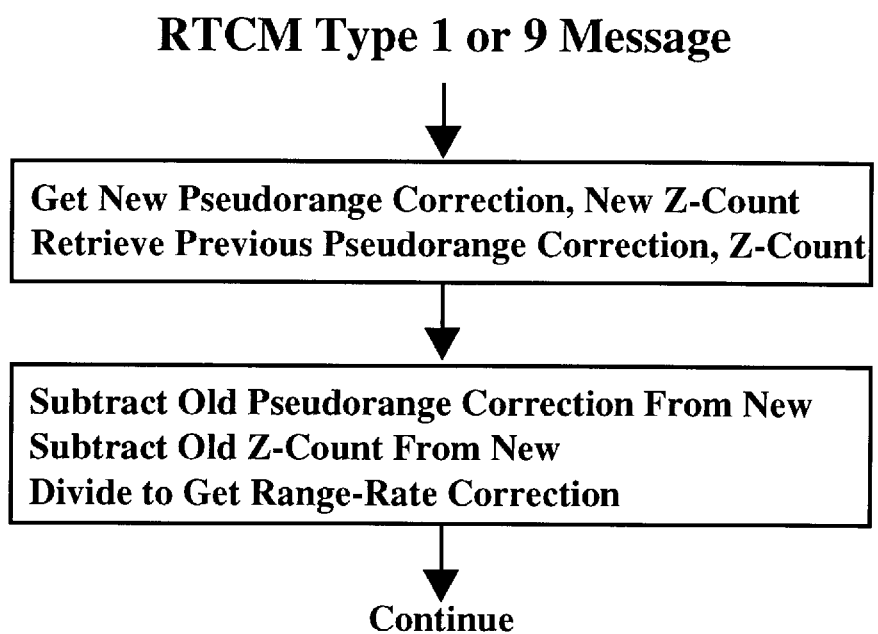
FIG. 13 shows the RTCM range-rate correction generation (RTCM Types 1 and 9) portion of the translation process of the present invention.
Figure 14:
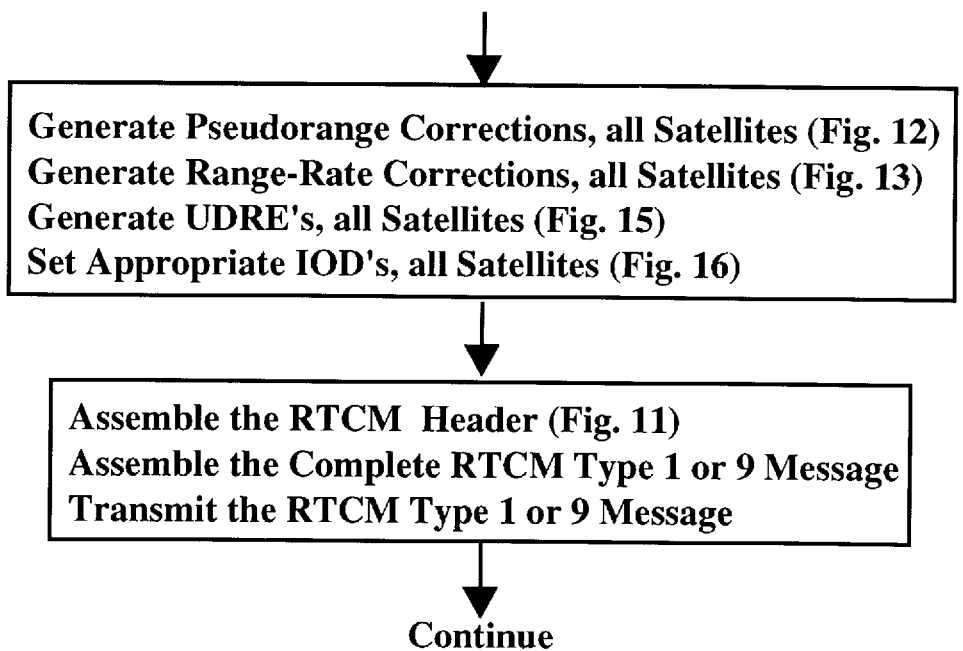
FIG. 14 shows the RTCM message Types 1 and 9 message generation portion of the translation process of the present invention.
Figure 16:
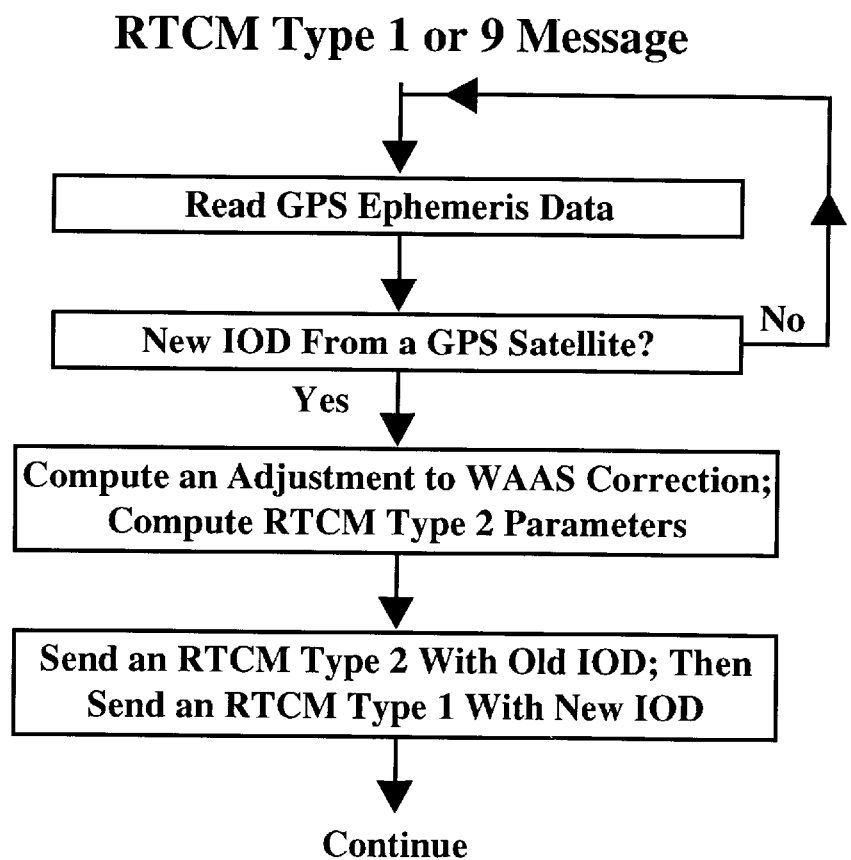
FIG. 16 shows the RTCM issue of data (IOD) portion of the translation process of the present invention.

TABLE 4 a. Compute the correction in pseudo range due to ephemeris error from WAAS Message Type 24 or 25
b. Compute the correction in pseudo range due to satellite clock error from WAAS Message Type 24 or 25
c. Compute the tropospheric model correction in pseudo range, preferably using the same model that the WAAS system will use
d. Compute the ionospheric correction in pseudo range, interpolating the vertical ionospheric delays in WAAS Message Type 26 from the nearest grid points identiiied in WAAS Message Type 18
e. Sum up all the pseudo range corrections in a)- d) - this is the RTCM pseudo range correction value
f. If the WAAS fast correction is set to "100000000000", it means "Don't Use", so the RTCM value will be set to "1000000000000000", which has he same meaning RTCM Range-Rate Correction Generation (RTCM Types 1 and 9): The WAAS does not provide this term directly. Rather, the RTCM Range-Rate Correction is found by dividing the difference between the last two fast corrections by the time difference between the last two fast corrections. This portion of the translation process is further described in FIG. 13 and FIG. 14.

RTCM UDRE (RTCM Types 1 and 9): The UDRE stands for User Differential Range Error, a value which is expresses the uncertainty in the pseudo range correction. While it is similar in the RTCM and WAAS messages, there are several differences. A first difference is the fact that the WAAS UDRE is a 99.9 percentile, or 3.27-sigma, number, while the RTCM is a 68 percentile, or 1-sigma, number. Thus, the WAAS value must be divided by 3.27. A second difference is the fact that the UDRE value in the RTCM messages has only 4. A third difference is that the total UDRE is the root sum square of the UDRE value derived from the WAAS fast message and that derived from the WAAS ionospheric message. This portion of the translation process is further described in FIG. 15.

RTCM Issue of Data (IOD) (RTCM Types 1 and 9): The WAAS provides the IOD in Message Types 24, and usually this is the same as the RTCM IOD, which is associated with an ephemeris message for each satellite. However, there is an important difference that the WAAS-to-RTCM translator processing needs to take into account. The problem comes from the fact that for each satellite, the ephemeris (and IOD) change approximately once per hour. When that change occurs, there is no guarantee that both the WAAS system and the mobile users will decode and apply the message at precisely the same time. As a consequence, when an ephemeris changeover takes place, the WAAS is designed to wait two minutes or more before utilizing the new ephemeris information, in order to make sure that user receivers have decoded the new ephemeris message; if an ephemeris message is missed, it will be 30 seconds before the next message is sent.

While WAAS receivers will be designed to handle this two minute wait, most current receivers immediately apply the new ephemeris information and flush out the old. To account for this, the WAAS-to RTCM translator needs to reconstruct the orbital ephemerides. This involves differencing the old and the new ephemerides (which provide the orbital parameters which enable the receiver to determine the location of the satellite in space), determining the effect on the correction, and adjusting the pseudo range correction accordingly. WAAS Message Types 24 and 25 have IOD's that change several minutes after GPS satellite IOD changes (which indicate new ephemerides). The WAAS-to RTCM translator must make these WAAS IOD changes transparent to the user receiver. To accomplish this, the translator should, upon detecting a change in a GPS satellite IOD, compute adjustment terms to the pseudo range and range-rate corrections (similar to the delta pseudo range and delta range-rate term in the RTCM Message Type 2), add these adjustments to the WAAS-derived corrections, and issue an RTCM Message Type 2, followed by an RTCM Message Type 1 having the new GPS ephemeris information, in the same manner a conventional reference station would provide them. On the other hand, when the WAAS message indicates a change in IOD, the translator should stop applying these adjustments, because they are no longer necessary. However, the IOD's sent to the user receiver show no change, thus making WAAS IOD changes transparent to the user. Hence, the user receiver will not produce a "discontinuous" position jump or error.

Figure 17:
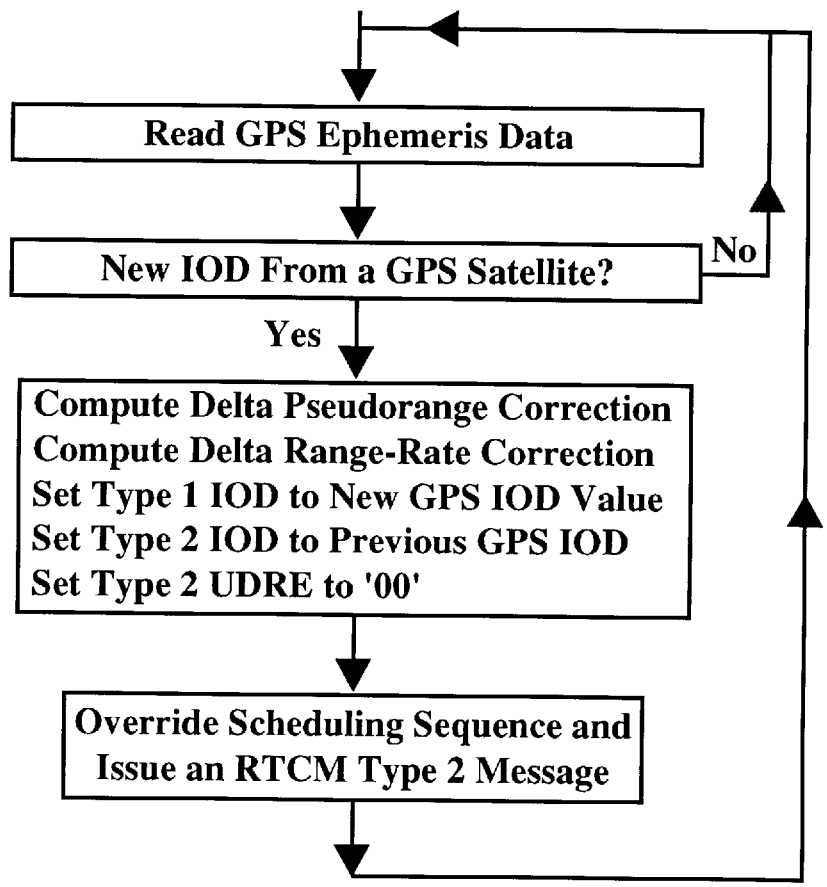
FIG. 17 shows the RTCM Type 2 message generation portion of the translation process of the present invention.

RTCM Type 2 Message—"Delta" Differential Corrections: Some RTCM-compatible receivers are slow to decode the GPS ephemeris data, such that those receivers may still be using old ephemeris data even after the two minute wait period employed by WAAS. The RTCM Type 2 message provides the adjustment to the differential corrections to enable these receivers to get full accuracy until they decode the new ephemeris, after which the Type 2 messages can be ignored. This portion of the translation process is further described in FIG. 17.

RTCM Type 6 Message—Filler: These messages are available to those data links that employ radio modems that continuously broadcast. RTCM-compatible DGPS receivers are designed to ignore these messages. The WAAS to RTCM translator needs to be designed so that the operator can program in Type 6 messages.

Figure 18:
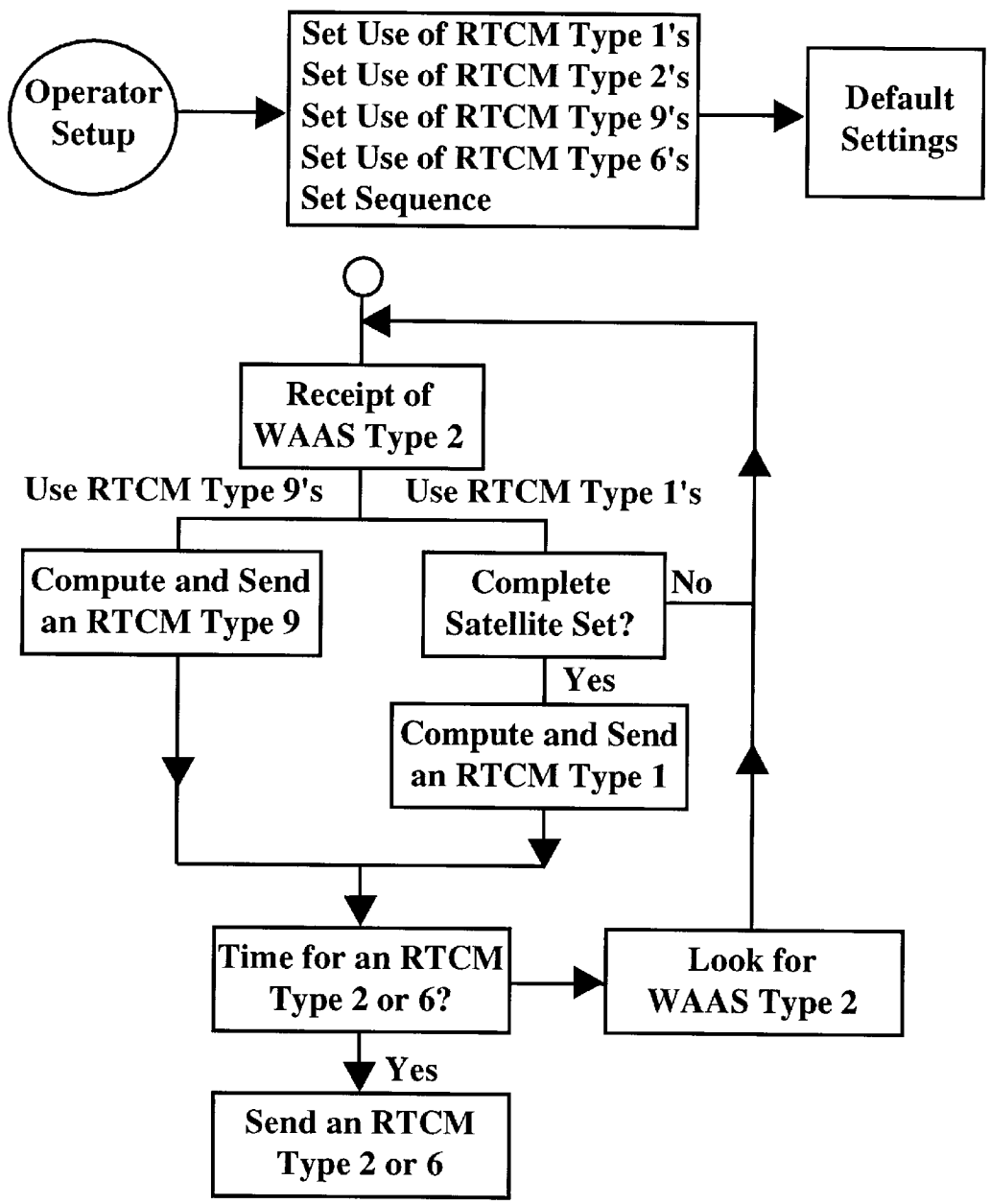
FIG. 18 shows the RTCM message scheduling portion of the translation process of the present invention.

Scheduling of RTCM Messages: Scheduling of messages is straightforward. The WAAS to RTCM translators should be designed to enable the operators to select Type 1 messages or Type 9 messages, select the nominal frequency of Type 2 messages, and select Type 6 messages if required by the data link. RTCM Message Type 9's should be sent as the WAAS messages are decoded. However, most RTCM compatible receivers don't recognize Type 9's, and instead look for Type 1's. Each WAAS fast correction message may not contain all the satellites in view, that is, it may take two or three fast correction messages to cover all the satellites tracked by the mobile GPS receivers. When this happens, it will be necessary to delay the earlier messages(s) and issue a complete RTCM Type 1 message, with timing adjustments made so that all visible satellites have the same Z-count time tag. In the non-cooperative and portable reference station embodiments of the present invention, the GPS receiver portion included in the retrofit receiver determines which GPS satellites are visible. In the cooperative embodiment of the present invention, the input of the satellite ephemeris information from the coupled RTCM compatible DGPS receiver identifies the GPS satellites in view. This portion of the translation process is further described in FIG. 18.

Additional information regarding the performance specifications of WAAS can be found in "Minimum Operational Performance Standards for Global Positioning System/Wide Area Augmentation System Airborne Equipment", RTCA Document No. RTCA/DO-229, Jan. 16, 1996, available from Radio Technical Commission for Aeronautics (RTCA), 1140 Connecticut Ave. NW, Suite 1020, Washington, D.C., 20036, and is incorporated herein as background information. Similarly, additional information regarding RTCM standards can be found in "RTCM Recommended Standards for Differential Navstar GPS Service, Version 2.1, Jan. 3, 1994", RTCM Special Committee No. 104, Radio Technical Commission for Maritime Services, 655 Fifteenth Street, NW, Suite 300 Washington, D.C. 20005, and is incorporated herein as background information.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A Global Positioning System (GPS) Wide Area Augmentation System (WAAS) retrofit receiver comprising:
   a) an antenna;
   b) a receiver coupled to said antenna to receive a WAAS message via said antenna, said receiver further adapted to translate said WAAS message into an RTCM (Radio Technical Commission for Maritime Services) message; and
   c) a communications port included in said receiver, said communications port adapted to implement a communications link and couple said RTCM message to a GPS receiver via said communications link such that said GPS receiver can utilize said WAAS message without modification of said GPS receiver.

2. The GPS WAAS retrofit receiver of claim 1, wherein said receiver is adapted to receive GPS signals and determine a position using said GPS signals, wherein said position is utilized by said receiver to interpret said WAAS message.

3. The GPS WAAS retrofit receiver of claim 1, wherein said receiver is adapted to interact with said GPS receiver to obtain satellite orbital information from said GPS receiver, wherein said position is utilized by said receiver to interpret said WAAS message.

4. The GPS WAAS retrofit receiver of claim 1, wherein said communications link is a radio link such that said RTCM message can be transmitted to a plurality of GPS receivers in a local area.

5. The GPS WAAS retrofit receiver of claim 1, wherein said RTCM message includes GPS satellite integrity information from said WAAS message.

6. A Global Positioning System (GPS) Wide Area Augmentation System (WAAS) retrofit receiver comprising:
   a receiver adapted to receive a WAAS signal;
   said receiver adapted to determine a WAAS message conveyed by said WAAS signal, said receiver adapted to interpret said WAAS message and to translate said WAAS message into an RTCM (Radio Technical Commission for Maritime Services) message and couple said RTCM message to an external GPS receiver such that said external GPS receiver can utilize said WAAS message without modification of said external GPS receiver.

7. The GPS WAAS retrofit receiver of claim 6, wherein said receiver is adapted to receive a GPS signal and determine a position using said GPS signal, wherein said position is utilized by said receiver to interpret said WAAS message.

8. The GPS WAAS retrofit receiver of claim 6, wherein said receiver is adapted to interact with said external GPS receiver to obtain a position from said external GPS receiver, wherein said position is utilized by said receiver to interpret said WAAS message.

9. The GPS WAAS retrofit receiver of claim 6, wherein said receiver couples said RTCM message to said external GPS receiver via a wireless communications link such that said RTCM message is simultaneously transmitted to a plurality of external GPS receivers in a local area.

10. The GPS WAAS retrofit receiver of claim 6, wherein said RTCM message includes GPS satellite integrity information from said WAAS message.

11. With a differential Global Positioning System (DGPS) receiver designed to accept a Radio Technical Commission for Maritime Service (RTCM) format message, a method of retrofitting the DGPS receiver to accept a Wide Area Augmentation System (WAAS) format message, the method comprising the steps of:
   a) receiving a WAAS message with a receiver;
   b) interpreting said WAAS message;
   c) translating said WAAS message into an RTCM message; and
   d) coupling said RTCM message to an external GPS receiver adapted to receive said RTCM message such that said external GPS receiver can utilize said WAAS message without modification of said external GPS receiver.

12. The method of claim 11, wherein step b) further comprises the steps of:
   receiving a GPS signal with said receiver;
   determining a position using said GPS signal; and
   interpreting said WAAS message using said position.

13. The method of claim 11, wherein step b) further comprises the steps of:
   interfacing with said external GPS receiver;
   obtaining a position from said external GPS receiver; and
   interpreting said WAAS message using said position.

14. The method of claim 11, wherein step d) further comprises the steps of:
   coupling said receiver to said external GPS receiver via a communications port; and
   transmitting said RTCM message via said communications port.

15. The method of claim 11, wherein step d) further includes the step of coupling said receiver to said external GPS receiver via a wireless link such that said WAAS message can be transmitted to a plurality of external GPS receivers.

16. With a differential Global Positioning System (DGPS) receiver designed to accept a Radio Technical Commission for Maritime Service (RTCM) format message, a method of retrofitting the GPS receiver to accept a Wide Area Augmentation System (WAAS) format message and processing orbital data changes in global positioning system (GPS) messages, the method comprising the steps of:
   a) receiving a GPS message;
   b) detecting a change in a GPS satellite issue of data;
   c) determine a differential correction adjusting for said change in said GPS satellite issue of data;
   d) subtracting said differential correction from a previous differential correction to obtain a delta differential correction;
   e) translating said differential correction into an RTCM Message Type 1;
   f) translating said delta differential correction into an RTCM Message Type 2; and
   g) coupling said RTCM message type 1 and said RTCM Message Type 2 to an external DGPS receiver capable of receiving said RTCM messages such that said external DGPS receiver processes without causing a position discontinuity or error in said external DGPS receiver.

* * * * *